United States Patent
Tabak et al.

(10) Patent No.: US 10,534,685 B2
(45) Date of Patent: Jan. 14, 2020

(54) APPLICATION MONITORING

(71) Applicant: SAP SE, Walldorf (DE)

(72) Inventors: Ami Tabak, Rosh Haayin (IL); Elad Schulman, Petah Tikvah (IL); Guy Hasenfeld, Ra'anana (IL)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 15/342,322

(22) Filed: Nov. 3, 2016

(65) Prior Publication Data

US 2018/0121309 A1    May 3, 2018

(51) Int. Cl.
*G06F 11/00*    (2006.01)
*G06F 11/34*    (2006.01)

(52) U.S. Cl.
CPC .............................. *G06F 11/3414* (2013.01)

(58) Field of Classification Search
CPC ............. G06F 11/3414; G06F 11/0793; G06F 11/0745; G06F 11/1474; G06F 2201/87
See application file for complete search history.

(56) References Cited

U.S. PATENT DOCUMENTS

| | | | | |
|---|---|---|---|---|
| 8,095,910 B2* | 1/2012 | Nathan | ...................... | G06F 8/24 717/107 |
| 8,612,995 B1* | 12/2013 | Yun | ........................ | G06F 13/00 719/313 |
| 9,100,440 B1* | 8/2015 | Manmohan | ............. | H04L 63/20 |
| 9,571,591 B2* | 2/2017 | Greifeneder | ............ | H04L 67/22 |
| 2010/0299655 A1* | 11/2010 | Heisch | ................ | G06F 11/3409 717/130 |
| 2012/0167057 A1* | 6/2012 | Schmich | ............. | G06F 11/3644 717/130 |
| 2013/0129343 A1* | 5/2013 | Kram | ................. | H04B 10/0773 398/17 |
| 2015/0278515 A1* | 10/2015 | Foley | ...................... | G06F 21/54 726/23 |
| 2016/0224461 A1* | 8/2016 | Araya | ................. | G06F 11/3644 |
| 2018/0196732 A1* | 7/2018 | Dolev | ................. | G06F 11/3612 |

* cited by examiner

*Primary Examiner* — Christopher S McCarthy
(74) *Attorney, Agent, or Firm* — Mintz Levin Cohn Ferris Glovsky and Popeo, P.C.

(57) ABSTRACT

A method, a system, and a computer program product for monitoring of software applications are disclosed. A request for data associated with a software application is received. Based on the received request, a monitoring agent is injected in a response data. The response data is responsive to the received request. Using the monitoring agent, at least one transaction implementing the response data is monitored. The transaction is executed by the software application. Data associated with execution of the transaction is collected based on the monitoring.

17 Claims, 5 Drawing Sheets

APPLICATION MONITORING

TECHNICAL FIELD

This disclosure relates generally to data processing and, in particular, to end-to-end monitoring of software applications.

BACKGROUND

Today, many companies and individuals rely on effective operation of software applications in conducting their daily activities. The software applications include internet browsing applications, financial software applications, sales applications, and/or many other types of applications. Software is typically used by individuals to perform a variety of tasks. Periodically, it is important monitor and/or track actions by these individuals to ensure, for example, proper and/or efficient operation of the software applications, detection of harmful activities by the individuals, assembling statistics relating to the usage of software application, and/or for many other reasons.

Typically, such monitoring and/or tracking are performed in one or more locations, such as servers providing data and/or applications to the user. The monitoring and/or tracking sometimes interfere with the user's usage of the software applications, for example, by slowing down the speed of browsing, loading of data, etc. Additionally, the monitoring and/or tracking of activities does not provide application and/or data providers with a full understanding of which transactions were performed, what data was requested, etc. from a point of view of an end user as well as from a point of view of the application and/or data provider. Thus, there is a need to provide for an effective and efficient way of monitoring and/or tracking of software applications to ensure a complete understanding of software applications' usage.

SUMMARY

In some implementations, the current subject matter relates to a computer implemented method for monitoring of software applications. The method can include receiving a request for data associated with a software application, injecting, based on the received request, a monitoring agent in a response data, the response data being responsive to the received request, monitoring, using the monitoring agent, at least one transaction implementing the response data, the transaction being executed by the software application, and collecting, based on the monitoring, data associated with execution of the transaction. At least one of the receiving, the injecting, the monitoring, and the collecting can be performed on at least one processor of at least one computing system.

In some implementations, the current subject matter can include one or more of the following optional features. The monitoring can include generating a first timestamp being indicative of a beginning of collection of data associated with execution of the at least one transaction; executing a first script for beginning collection of data associated with execution of the at least one transaction; detecting completion of the execution of the at least one transaction; executing a second script for completing collection of data associated with execution of the at least one transaction; an generating a second timestamp being indicative of a completion of collection of data associated with execution of the at least one transaction.

In some implementations, the collecting can include collecting data associated with execution of the at least one transaction at a user endpoint, the user endpoint generating the request for data associated with the software application; and collecting data associated with execution of the at least one transaction at a provider endpoint, the provider endpoint generating and transmitting the response data to the user endpoint, the user endpoint being communicatively coupled to the provider endpoint.

In some implementations, the method can include associating an identifier with the at least one of the data collected at the user endpoint and the data collected at the provider endpoint. The method can also include correlating, using the identifier, the data collected at the user endpoint and the data collected at the provider endpoint; and analyzing the correlated data.

In some implementations, the monitoring can include at least one of the following: monitoring the at least one transaction being executed by the software application, monitoring a plurality of transactions being executed by the software application, and monitoring execution of the software application.

In some implementations, the method can further include terminating collection of data upon completion of execution of the at least one transaction; and removing the injected agent.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
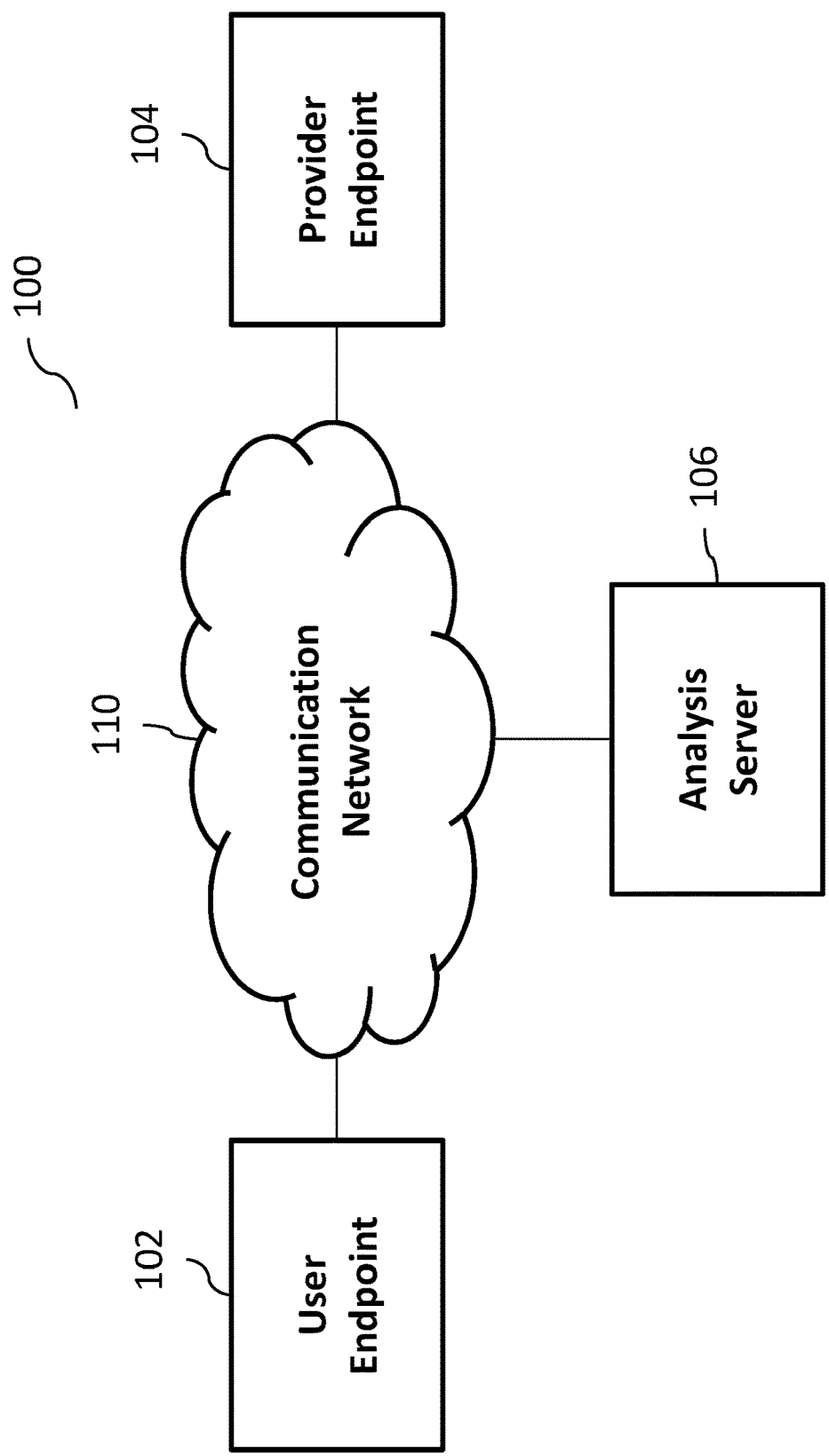
FIG. 1 illustrates an exemplary system for monitoring of software applications, according to some implementations of the current subject matter.

To address these and potentially other deficiencies of currently available solutions, one or more implementations of the current subject matter relate to methods, systems, articles of manufacture, and the like that can, among other possible advantages, provide end-to-end monitoring of software applications.

In some implementations, the current subject matter can provide an ability of software application providers (e.g., software-as-a-service ("SaaS")) to monitor applications that they provide to their users. The monitoring can be end-to-end, i.e., from the client or user side endpoint (e.g., browser, and/or any other user/client technology), at the application service provider's endpoint, and a network connection communicatively coupling the user endpoint and the application provider's endpoint. The monitoring can include at least one of the following: monitoring of actions executed at the user endpoint (e.g., requests for loading a web page, executing a script, etc.), monitoring of actions executed at the application provider's endpoint (e.g., responding to requests received from the user, storing data received from the user, etc.), transmission of data through the network connection, and/or any other actions and/or any combinations thereof. The monitoring can be context-based and can correlate each distinct application programming interface ("API") call made from and/or any other action executed at the user endpoint, transmitted through the network connection to the provider's endpoint, and received at the provider's endpoint. The current subject matter can perform such monitoring and/or correlation on a per action basis and/or on a basis of a plurality of actions.

In some implementations, the current subject matter can perform monitoring of any actions executed at the user's endpoint, which can include user's interactions with various third parties' applications, objects, data, etc. This can allow collection of information and/or data about interactions, determination that the user is interacting with authorized third parties, and/or for any other purposes. The current subject matter's monitoring mechanisms do not require changing of programming code of the user endpoint's software applications or structures nor require changing of programming code of the provider endpoint's software applications or structures.

In some implementations, to perform end-to-end monitoring and/or data collection associated with use and/or execution of software applications, the current subject matter can inject (and/or insert, install, etc.) an agent (e.g., a software code, etc.) that can be executed at the user endpoint as the user performs and/or executes various actions, downloads data from the provider's servers, communicates with third parties, and/or any other transactions. The agent can be implemented in any computing environment and/or software application. Once the agent is injected, the agent can perform monitoring of any transactions performed by the user and/or the application (e.g., HTTP calls, APIs, etc.) at the user endpoint. The agent can collect data associated with transactions performed by the user and/or the application and can provide same to the provider endpoint and/or any other entity (e.g., an analysis server, a data center, etc.) without interfering with operation and/or the code of the software application. In some implementations, the data associated with transactions can be separately collected at the provider's endpoint using its own agent that may be injected/installed at the provider's endpoint. To correlate data collected at the user's endpoint with data collected at the provider's endpoint relating to the same transaction, a contextual token can be transmitted together with any communication from the user's endpoint (e.g., an HTTP response, etc.). The token can be reported as part of the data collected at the user's endpoint. The token can be unique to the specific transaction, thereby allowing contextual correlation and/or tracking. The token can relate to a collection of transactions. In some implementations, the token can be generated on the user side and transmitted via each request into one or more backend servers (e.g., at the provider's endpoint and/or at any other entity), where the token can be received, processed, and/or stored by one or more agents running in the backend servers. In alternate implementations, one or more backend servers (e.g., at the provider's endpoint and/or at any other entity) can generate one or more tokens and transmit token(s) to the user's endpoint (e.g., via an HTTP response).

In some implementations, one of the advantages of the current subject matter is that it can allow monitoring of any and/or all transactions of any and/or all applications at any time. This can allow the provider's endpoint to monitor all users without selecting specific users for monitoring. The current subject matter can also allow correlation of user endpoint data and provider endpoint data in a contextual manner, e.g., for any and/or all user-provider interaction. The current subject matter is based on contextual data collection rather than statistically-aggregated data, and as stated above, does not require installation/downloading of separate logic scripts altering installed software applications on the user's side. The current subject matter does not require permanent cookies and can be based on transaction's session cookies and/or short time lived cookies.

FIG. 1 illustrates an exemplary system 100 for monitoring of software applications, according to some implementations of the current subject matter. The monitoring can be context-based, e.g., based on specific applications, transactions, clicks, component of an application, etc. The system 100 can perform end-to-end monitoring between user endpoints and provider endpoints. The monitoring can allow correlation of various transactions executed at the user's endpoint and at a provider's endpoint (for example, relating to the same application).

The system 100 can include a user endpoint 102 communicatively coupled to a provider endpoint 104 using a communication network 110. The system 100 can also include an analysis server 106 that can be communicatively coupled to the user endpoint 102 and the provider endpoint 104 using communication network 110.

The user endpoint 102 can be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, and/or any other devices and/or any combination thereof. In some exemplary implementations, the user endpoint can include HTML rendering capabilities, JavaScript running/execution capabilities, and/or can perform any other functionalities. Further, a determination of when to perform one or more of the above functionalities (e.g., HTML rendering, etc.) can be performed on a per call basis (e.g., depending on the call, the agent running at the user endpoint may or may not need execution of one or more of such functionalities). The user endpoint 102 can include a software, a hardware and/or any combination thereof capable of performing at least one transaction related to at least one software application. For example, the transaction can include transmitting an HTTP request to a server (i.e., provider endpoint 104) for an HTML page for presentation at the user endpoint 102 (e.g., displaying in a user interface of the user endpoint 102 the HTML page in a browser application). The user endpoint 102 can also perform any type of transactions, which can include interactions with the provider endpoint 104 and/or any other third parties and/or third party applications.

The provider endpoint 104 can be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The provider endpoint 104 can include a software, a hardware and/or any combination thereof that can provide applications, data, and/or any other information to the user endpoint 102. The applications, data, and/or information provided by the provider endpoint 104 can be used by the user endpoint in performing various transactions at the user endpoint 102. The provider endpoint 104 can also store information associated with transactions performed by the user endpoint 102.

The communication network 110 can be any type of wireless network, wired network, metropolitan area network ("MAN"), wide area network ("WAN"), local area network ("LAN"), virtual local area network ("VLAN"), Internet, intranet, extranet, and/or any other type of network, and/or any combination thereof.

The analysis server 106 can be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The server 106 can generate a monitoring agent for injection (or installation, insertion, etc.) at the user endpoint 102 for the purposes of monitoring transactions performed at the user endpoint 102. The server 106 can also process data/information collected by the monitoring agent and correlate the collected data/information with the data/information collected at the provider endpoint 104 by its monitoring agents existing or injected at the provider endpoint 104. The server 106 can provide a report to the provider endpoint 104 and/or any other third party on the correlated data/information.

Figure 2:
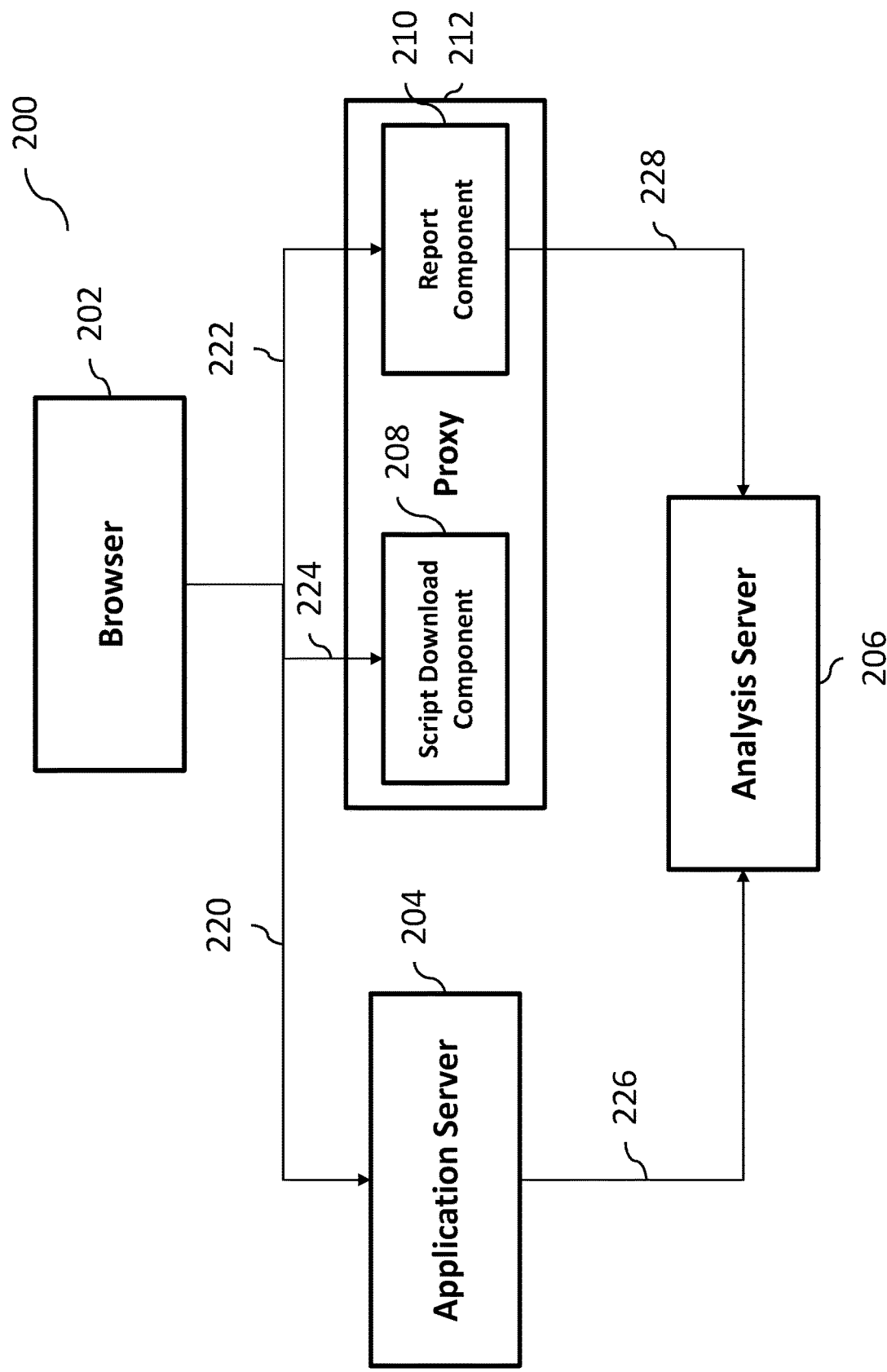
FIG. 2 illustrates an exemplary system for monitoring of software applications, according to some implementations of the current subject matter.

FIG. 2 illustrates an exemplary system 200 for monitoring of software applications, according to some implementations of the current subject matter. The monitoring can be of software applications, one or more transactions, a plurality of transactions, and/or specific transactions and/or any combination thereof. The system 200 can include a browser 202 (which can be operating at the user endpoint 102 shown in FIG. 1), an application server 204 (which can be similar to provider endpoint 104 shown in FIG. 1), an analysis server 206 (which can be similar to analysis server 106 shown in FIG. 1), and a proxy component 212. The proxy component 212 can include a script download component 208 and a report component 210.

In some implementations, an agent can be injected (or inserted, installed, added to, etc.) at the user endpoint, e.g., at browser 202. The agent can be software code that can allow tracking and/or monitoring of user's actions in the browser, transactions performed by the user, and/or any other software applications that may be operating at the user endpoint. The code can be added to and/or injected (or installed, inserted, added to, etc.) into the browser application, transaction, and/or any other software application operating at the user endpoint. The code can trigger collection of a timestamp(s) associated with execution of the software application and/or performance of a transaction (e.g., time corresponding to a start of execution of a particular software script, time corresponding to an end of execution of the script, and/or any other time and/or any combination thereof), information about the type of software application, transaction, etc. that is being executed, data relating to actions performed at the browser (e.g., requesting a particular website, requesting software application services from a third party, etc.), types of actions performed, and/or any other data, and/or any combination thereof. The data can be collected by the agent and transmitted to the analysis server 206 for processing. The collected data can be transmitted to the analysis server 206 instantaneously, with the next action executed at the user endpoint, in real-time, after a delay, and/or in any other manner. The collected data can be associated with a unique token that can identify the data being collected. The token can be used to correlate data collected at the browser and the application server for analysis purposes.

Similarly, an agent can be injected (installed, inserted, added to, etc.) at the application server 204. The agent at the application server can also trigger collection of a timestamp(s) associated with software application and/or transaction being executed at the user endpoint, information about the type of software application/transaction being executed, data relating to actions performed at the user endpoint, types of actions performed, and/or any other data, and/or any combination thereof. The data collected at the application server 204 can also be transmitted to the analysis server 206 for processing. This data can also be assigned a unique token that can be used to identify the data when it is being analyzed at the analysis server 206. The data received from the user endpoint and application server can be correlated to determine whether there are any discrepancies and/or similarities. In some exemplary implementations, a report showing correlation of the two data can be generated. The data at the application server 204 can be transmitted to the analysis server 206 instantaneously, with the next action executed at the user endpoint and/or provider endpoint, in real-time, after a delay, and/or in any other manner.

In some implementations, the agent can permanently reside at the user endpoint and/or the provider endpoint. Alternatively, the agent can be injected each time in response to the user's actions associated with a particular software application being monitored. For example, the agent can be injected in response to the user generating a request (e.g., an HTTP request, an HTTPS request, and/or any other request). The unique token can be assigned to the collected data every time the data is transmitted to the analysis server 206.

In some implementations, the browser 202 can be located at a user endpoint, such as on a user's computing device, which the user can use to access data, information, content, etc. from the provider endpoint or application server 204. The data can be accessed by the user by making a request 220 to the application server 204. For example, the request can be in a form of an HTTP request, an HTTPS request (e.g., resulting from the user entering a website address in the browser), and/or any other request. The user can also request access to data that may be within control of any other third party, in which case, the user can make a request to the third party's application server (not shown in FIG. 2 and which may or may not include one or more of the monitoring agents associated with system 200).

Once the application server 204 receives user's request, the application server can respond with the requested data (e.g., a web page). An agent can be injected into the responsive data and the responsive data along with the injected agent can be transmitted to the user. The injection can be performed by appending a code corresponding to the agent, where the code can be used to provide timestamps associated with user's actions and/or any other transactions performed at the user endpoint, track user's actions, cause collection of any other data, metadata, information, etc. and cause transmission of the collected data, metadata, information, etc. to the analysis server 206 for processing. In some exemplary implementations, the agent can be a Java script code. The agent code can also associate a unique token or an identification information (e.g., identifiers) to the collected data and transmit same to the application server 206 along with the collected information. The token/identification information can be used for correlation of the collected information at the analysis server 206. The page with the injected agent code can be displayed on the user's computing device. Operation of the page and/or any of its associated components will not be affected by the injected agent.

Once the agent code has been injected, a report indicating that the agent has been injected with the response to the user can be generated and transmitted (e.g., using an HTTP POST method 226) to the analysis server 206. In some exemplary implementations, the transmission of the request can be performed using an HTTP POST method. The report can be transmitted from the application server 204 to the analysis server 206.

After transmission of the report to the analysis server 206, the injected agent can request from the script download component 208 in the proxy component 212 (e.g., using an HTTPS GET method 224) to download a "top" script to the browser 202. The top script can be used to designate initiation of collection of data related to one or more transactions performed by the browser 202. The top script can also ensure that an appropriate start timestamp is associated with initiation of the data collection process. The collected data, including the start timestamp, can be provided to the report component 210 of the proxy component 212 (e.g., using an HTTPS POST method 222). The top script can be executed at the browser 202 along with any other transactions that may be associated with the initial request for data received from the browser 202. In some exemplary implementations, the top script can be a Java script. The following exemplary, non-limiting Java script code can be used for the top script:

```
functionality.classification.http.jsem.inject.topScript= \
    <script> \
        try{ \
            var abcMsr={ }; \
            abcMsr.sTime=new Date( ); \
            abcMsr.customerId='{CUSTOMER_ID_TMP}'; \
            abcMsr.serverIp='{FULL_SERVER_IP_TMP}'; \
            abcMsr.optrctx='{OPTR_CNTX_TMP}'; \
            abcMsr.appName='${functionality.classification.http.jsem.inject.appName}'; \
            var
abcJs=document.createElement('script');abcJs.type='text/javascript';abcJs.async=true; \
abcJs.src='${functionality.classification.http.jsem.inject.scriptsFolder}abcAjax.script.min.js'; \
            var head=document.getElementsByTagName('head')[0]; \
            head.appendChild(abcJs) \
        } \
        catch(t){ }; \
    </script>
```

Once the data has been uploaded to the browser 202 and/or one or more of any other transactions associated the initial request from the browser 202 are performed, the script download component 208 can be requested to download a "bottom" script (e.g., using HTTPS GET method 224). The bottom script can be used to designate completion of collection of data related to one or more transactions performed by the browser 202. The bottom script can also ensure that an appropriate end timestamp is associated with completion of the data collection process. The collected data, including the end timestamp, can be provided to the report component 210 of the proxy component 212 (e.g., using an HTTPS POST method 222). In some exemplary implementations, the bottom script can be a Java script. The following exemplary, non-limiting Java script code can be used for the bottom script:

```
functionality.classification.http.jsem.inject.bottomScript = \
    <script> \
        try { \
            if(!abcMsr.isLoadInitialized) { \
                abcMsr.UsrOnLoad = window.onload; \
                abcMsr.oOnLoad = function( ){ \
                    try{ \
                        abcMsr.lTime=new Date( ); \
                        var abcJs = document.createElement('script'); abcJs.type =
'text/javascript';abcJs.async = true; \
                        abcJs.src =
'${functionality.classification.http.jsem.inject.scriptsFolder}abcJSEM.script.min.js'; \
```

```
                document.body.appendChild(abcJs); \
            } catch (e) { } \
            if(abcMsr.UsrOnLoad)abcMsr.UsrOnLoad( ); \
        }; \
        window.onload=abcMsr.oOnLoad; \
        abcMsr.isLoadInitialized = true; \
    } \
    abcMsr.debug='{DEBUG_MODE_TMP}'; \
    abcMsr.rTime=new Date( ); \
    abcMsr.collectPrf={COLLECT_PERF}; \
    abcMsr.collectRsc={COLLECT_RSC}; \
} \
catch (t) { }; \
</script>
```

Once the report component 210 receives all data resulting from downloading of top and bottom scripts, the report component 210 can provide a report to the analysis server 206 (e.g., using an HTTP POST method 228). The analysis server 206, using a unique token assigned to the collected data by the injected agent, can correlate the data that it received from the application server 204 (e.g., using HTTP POST method 226) and the data that it received from the proxy component 212 (e.g., using HTTP POST method 228). The analysis server 206 can compile a report that can show execution of transactions at the browser 202 and execution of corresponding transactions, if any, at the application server 204. The report can note any discrepancies, errors, alerts, etc. In some implementations, the report can offer suggestions as to how to resolve any discrepancies between the data received from the browser 202 (via the proxy component 212) and from the application server 204.

Figure 3:
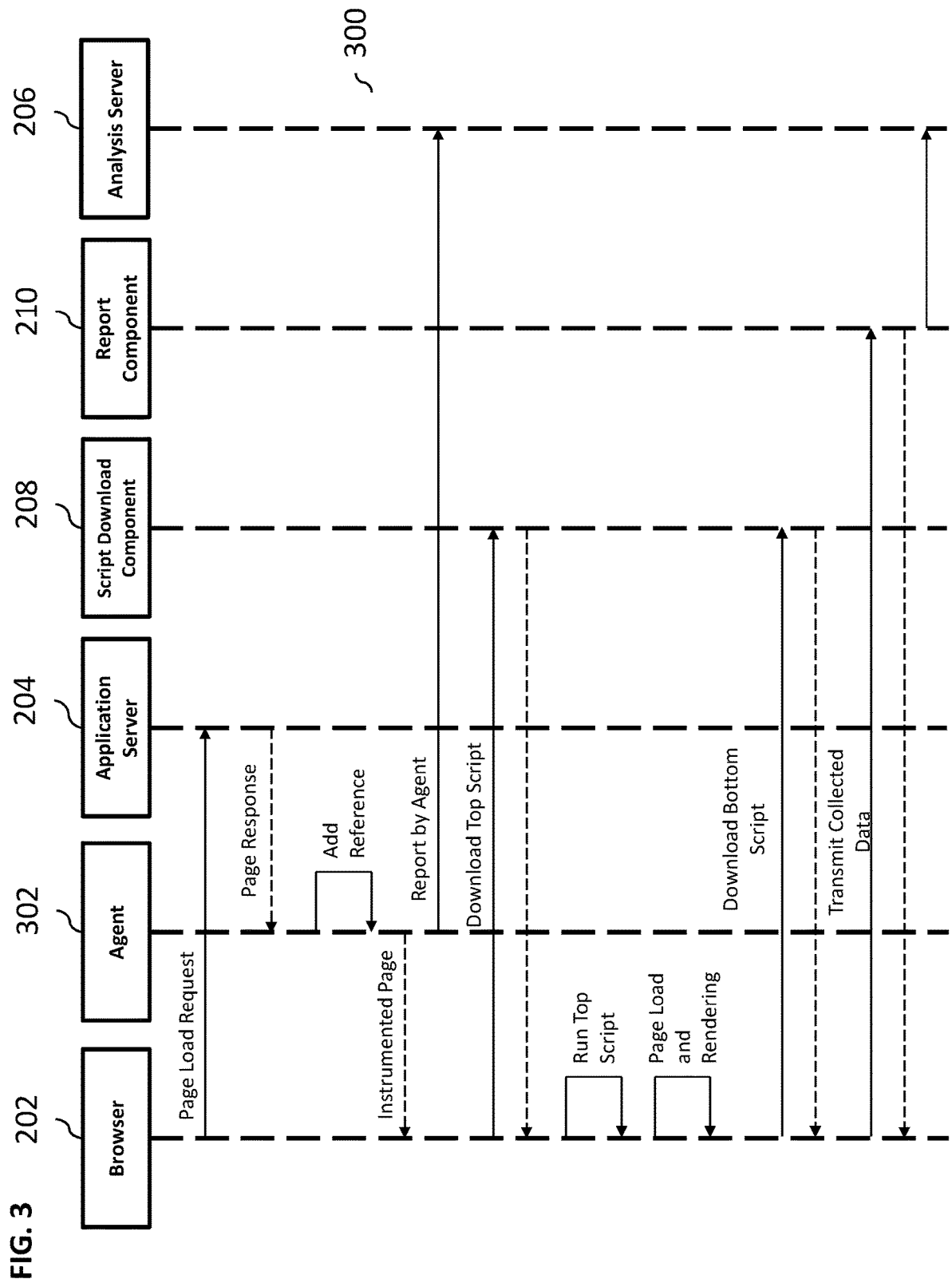
FIG. 3 illustrates an exemplary process for monitoring software applications, according to some implementations of the current subject matter.

FIG. 3 illustrates an exemplary process 300 for monitoring software applications, according to some implementations of the current subject matter. The process 300 can be performed by the systems 100 and 200 (as shown in FIGS. 1 and 2, respectively). The process 300 can be performed by the browser component 202, an agent 302 running at the application server 204, the script download component 208, the report component 210, and the analysis server 206. The script download component 208 and the report component 210 can be located at the proxy component 212 (shown in FIG. 2).

As shown in FIG. 3, the browser 202 can initiate a transaction, e.g., generating a page load request. The page load request can be transmitted to the application server 204. The agent 302 (which can be a software code) can detect the page load request from the browser 202. The application server 204 can respond with a page response. The page response can be transmitted back to the browser 202. The agent 302 code can be injected (inserted, installed, etc.) or added as a reference or attached to the page response being transmitted to the browser 202.

Once the agent 302 code is attached to the page response, an instrumented page can be transmitted to the browser 202. The instrumented page can include the page originally requested by the browser along with the agent 302 code.

Then, the agent 302 can inform the analysis server 206 that the browser 202 has been provided with a requested page along with the agent 302 code. The code can enable tracking of transactions that may be performed by the browser 202 in connection with the requested page. The transactions can include execution of scripts, requesting data from a third party, navigating within the requested page, and/or any other transactions and/or any combination thereof.

The script download component 208 can then download a top script for execution at the browser 202. The top script can enable initiation of tracking of transactions performed at the browser 202 and creation of a timestamp that is indicative of the initiation of tracking activities. The top script can be executed at the browser 202. Then, the browser 202 can load and/or render the requested page for viewing in the browser 202.

Once the page load and/or rendering and/or any other transactions are complete, the script download component 208 can download a bottom script for execution at the browser 202. The bottom script can insert a timestamp indicative of completion of tracking activities. The collected data can be transmitted to the report component 210, which can then transmit it to the analysis server 206.

In some implementations, the collected data can be compiled using a time-series methodology, such as an online analytical processing ("OLAP") cube. The collected data can be indicative of the one or more transactions performed at the browser 202, any data that may have been requested from a third party, start time of the activities associated with the initial request received from the browser 202, end time of the activities, total amount of time consumed by the activities, processing capacity consumed in performing the activities, and/or any other information.

In some implementations, the current subject matter can track a single transaction and/or multiple transactions and/or an execution of an entire application. Further, the tracking can be based on a specific type of transaction (e.g., browsing of the Internet, requesting financial data from servers, etc.). In this scenario, the specific type of transaction can be identified using a predetermined identifier, which can cause invoke insertion of the agent 302 and subsequent tracking activities.

In some implementations, one or more of the browser 202, the agent 302, the application server 204, the script download component 208, the report component 210, and the analysis server 206 can be disposed in a single location and/or in multiple locations. The system can be disposed in a cloud, on any type of network (e.g., wireless network, wired network, MAN, WAN, LAN, VLAN, Internet, intranet, extranet, and/or any other type of network, and/or any combination thereof).

Figure 4:
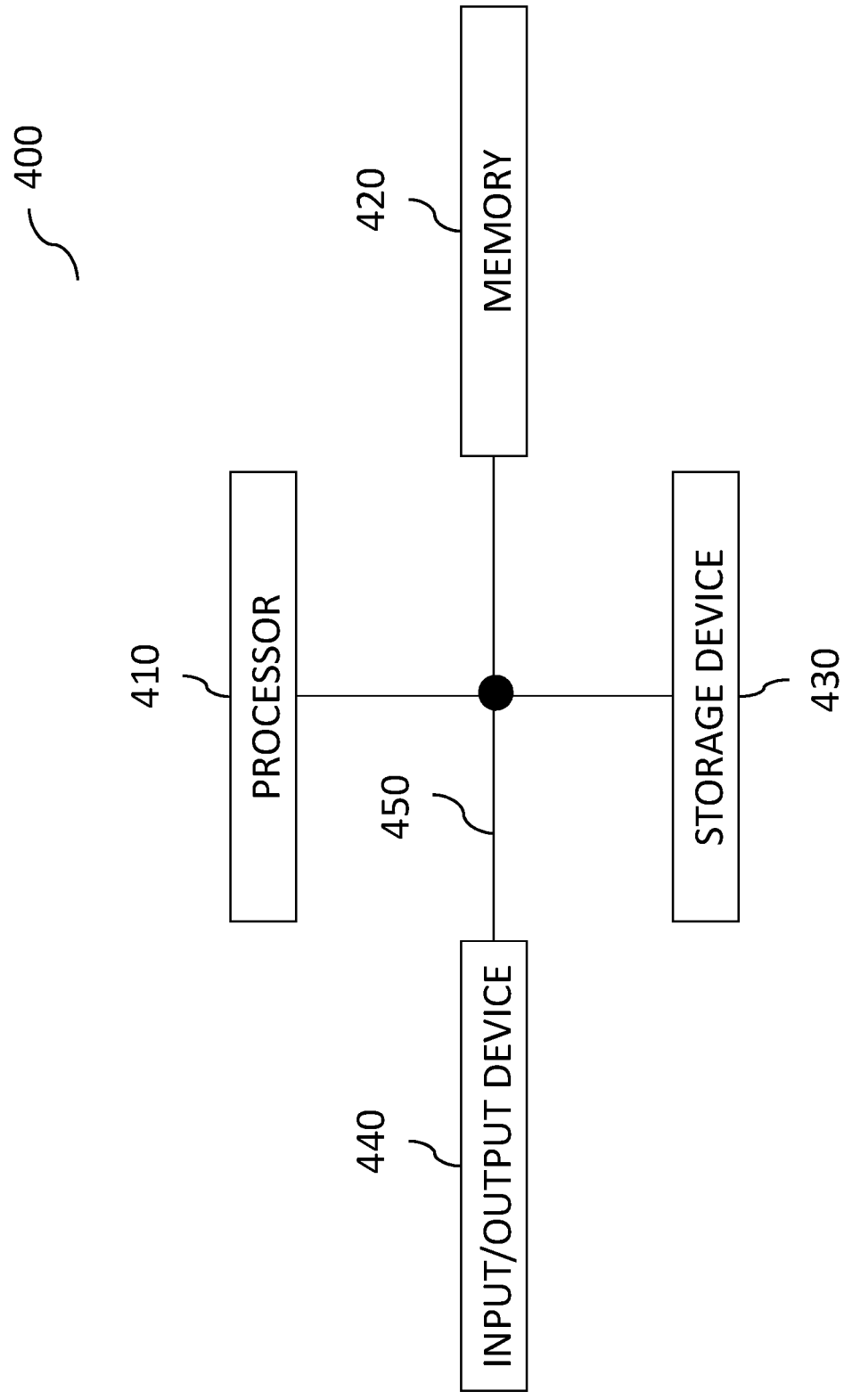
FIG. 4 is an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
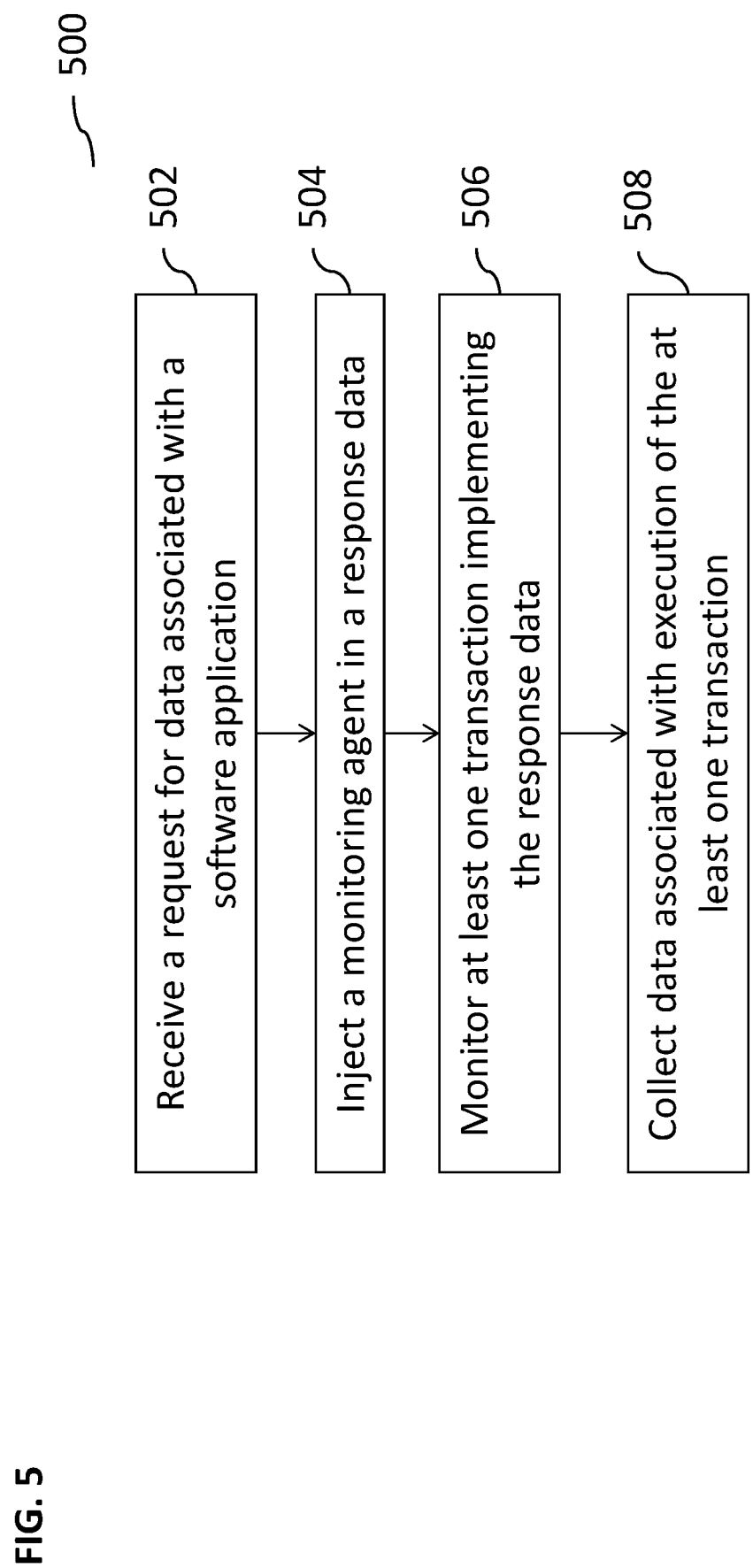
FIG. 5 is an exemplary method, according to some implementations of the current subject matter.

FIG. 5 illustrates an exemplary method 500 for tracking software applications, according to some implementations of the current subject matter. At 502, a request for data associated with a software application can be received (e.g., a request to load a webpage received from the browser 202 by the application server 204 as shown in FIG. 2). At 504, based on the received request, a monitoring agent can be injected into the data responsive to the received request (e.g., the agent 302 can add a reference to the webpage requested by the browser 202, as shown in FIG. 3). At 506, using the monitoring agent (e.g., agent 302 as shown in FIG. 3), at least one transaction implementing the response data can be monitored. The transaction (e.g., user loading the webpage, navigating the webpage, etc.) can be executed by the software application (e.g., browser 202). In this case, the browser 202, based on the injected agent, can request downloading of a top script from the script download component 208 of the proxy component 212, as shown in FIGS. 2 and 3. The top script is executed, which can cause creation of a timestamp and initiation of collection of data. At 508, based on the monitoring, data associated with execution of the transaction can be collected. Once the data collection has been completed, the browser 202 can request downloading of the bottom script from the script download component 208. The bottom script can cause assignment of another timestamp that may be indicative of a completion of collection of data. The collected data can be assigned a unique token or an identifier, which can be used to analyze and/or correlate collected data with the data collected at the application server 204. The collected data can be transmitted to the report component 210. The token/identifier can be assigned by the report component 210 and/or at the browser 202 and/or by any other component in the system 200. The report component 210 then provides the collected data to the analysis server 206.

In some implementations, the current subject matter can include one or more of the following optional features. The monitoring can include generating a first timestamp being indicative of a beginning of collection of data associated with execution of the at least one transaction; executing a first script for beginning collection of data associated with execution of the at least one transaction; detecting completion of the execution of the at least one transaction; executing a second script for completing collection of data associated with execution of the at least one transaction; an generating a second timestamp being indicative of a completion of collection of data associated with execution of the at least one transaction.

In some implementations, the collecting can include collecting data associated with execution of the at least one transaction at a user endpoint, the user endpoint generating the request for data associated with the software application; and collecting data associated with execution of the at least one transaction at a provider endpoint, the provider endpoint generating and transmitting the response data to the user endpoint, the user endpoint being communicatively coupled to the provider endpoint.

In some implementations, the method can include associating an identifier with the at least one of the data collected at the user endpoint and the data collected at the provider endpoint. The method can also include correlating, using the identifier, the data collected at the user endpoint and the data collected at the provider endpoint; and analyzing the correlated data.

In some implementations, the monitoring can include at least one of the following: monitoring the at least one transaction being executed by the software application, monitoring a plurality of transactions being executed by the software application, and monitoring execution of the software application.

In some implementations, the method can further include terminating collection of data upon completion of execution of the at least one transaction; and removing the injected agent.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a request for data associated with a software application;
   injecting, based on a context of the requested data, a context-based monitoring agent in a response data, the response data being responsive to the received request, the monitoring agent including an identifier generated based on the context of the requested data, the context of the requested data being indicative of the software application, a predetermined transaction, a predetermined function, and a predetermined component of the software application;
   monitoring, by the monitoring agent, at least one transaction implementing the response data, the at least one transaction being executed by the software application, wherein the monitoring comprises:
      generating a first timestamp being indicative of a beginning of collection of data associated with execution of the at least one transaction,
      executing a first script for beginning collection of data associated with execution of the at least one transaction,
      detecting completion of the execution of the at least one transaction;
      executing, in response to the detecting, a second script for completing the collection of data associated with execution of the at least one transaction, and
      generating, in response to the executing the second script, a second timestamp indicative of the completing of the collection of data associated with execution of the at least one transaction; and
   collecting, based on the monitoring, data associated with execution of the at least one transaction, the collecting including
      collecting data associated with execution of the at least one transaction at a user endpoint, the user endpoint generating the request for data associated with the software application; and collecting data associated with execution of the at least one transaction at a provider endpoint, the provider endpoint generating and transmitting the response data to the user endpoint, the user endpoint being communicatively coupled to the provider endpoint;

determining one or more discrepancies between the data collected at the user endpoint and the data collected at the provider endpoint; and generating one or more corrections for correcting the one or more determined discrepancies and transmitting, based on the generated one or more corrections, a corrected response to the user endpoint.

2. The method according to claim 1, further comprising:
receiving, in response to the injecting, a report indicating completion of the injection, wherein the monitoring further comprises transmitting a request to download the first script.

3. The method according to claim 1, further comprising associating an identifier with the at least one of the data collected at the user endpoint and the data collected at the provider endpoint.

4. The method according to claim 3, further comprising:
correlating, using the identifier, the data collected at the user endpoint and the data collected at the provider endpoint; and
analyzing the correlated data.

5. The method according to claim 1, wherein the monitoring includes at least one of the following: monitoring the at least one transaction being executed by the software application, monitoring a plurality of transactions being executed by the software application, and monitoring execution of the software application.

6. The method according to claim 1, further comprising:
terminating collection of data upon completion of execution of the at least one transaction; and
removing the injected agent.

7. A system comprising:
at least one programmable processor; and
a machine-readable medium storing instructions that, when executed by the at least one programmable processor, cause the at least one programmable processor to perform operations comprising:
receiving a request for data associated with a software application;
injecting, based on a context of the requested data, a context-based monitoring agent in a response data, the response data being responsive to the received request, the monitoring agent including an identifier generated based on the context of the requested data, the context of the requested data being indicative of the software application, a predetermined transaction, a predetermined function, and a predetermined component of the software application;
monitoring, by the monitoring agent, at least one transaction implementing the response data, the at least one transaction being executed by the software application, wherein the monitoring comprises:
generating a first timestamp being indicative of a beginning of collection of data associated with execution of the at least one transaction,
executing a first script for beginning collection of data associated with execution of the at least one transaction,
detecting completion of the execution of the at least one transaction;

executing, in response to the detecting, a second script for completing the collection of data associated with execution of the at least one transaction, and
generating, in response to the executing the second script, a second timestamp indicative of the completing of the collection of data associated with execution of the at least one transaction; and
collecting, based on the monitoring, data associated with execution of the at least one transaction, the collecting including
collecting data associated with execution of the at least one transaction at a user endpoint, the user endpoint generating the request for data associated with the software application; and
collecting data associated with execution of the at least one transaction at a provider endpoint, the provider endpoint generating and transmitting the response data to the user endpoint, the user endpoint being communicatively coupled to the provider endpoint
determining one or more discrepancies between the data collected at the user endpoint and the data collected at the provider endpoint; and
generating one or more corrections for correcting the one or more determined discrepancies and transmitting, based on the generated one or more corrections, a corrected response to the user endpoint.

8. The system according to claim 7, wherein the operations further comprise:
receiving, in response to the injecting, a report indicating completion of the injection, wherein the monitoring further comprises transmitting a request to download the first script.

9. The system according to claim 7, wherein the operations further comprise associating an identifier with the at least one of the data collected at the user endpoint and the data collected at the provider endpoint.

10. The system according to claim 9, wherein the operations further comprise:
correlating, using the identifier, the data collected at the user endpoint and the data collected at the provider endpoint; and
analyzing the correlated data.

11. The system according to claim 7, wherein the monitoring includes at least one of the following: monitoring the at least one transaction being executed by the software application, monitoring a plurality of transactions being executed by the software application, and monitoring execution of the software application.

12. The system according to claim 7, wherein the operations further comprise:
terminating collection of data upon completion of execution of the at least one transaction; and
removing the injected agent.

13. A computer program product comprising a non-transitory machine-readable medium storing instructions that, when executed by at least one programmable processor, cause the at least one programmable processor to perform operations comprising:
receiving a request for data associated with a software application;
injecting, based on a context of the requested data, a context-based monitoring agent in a response data, the response data being responsive to the received request, the monitoring agent including an identifier generated based on the context of the requested data, the context of the requested data being indicative of the software application, a predetermined transaction, a predetermined function, and a predetermined component of the software application;

monitoring, by the monitoring agent, at least one transaction implementing the response data, the at least one transaction being executed by the software application, wherein the monitoring comprises:

generating a first timestamp being indicative of a beginning of collection of data associated with execution of the at least one transaction, executing a first script for beginning collection of data associated with execution of the at least one transaction, detecting completion of the execution of the at least one transaction;

executing, in response to the detecting, a second script for completing the collection of data associated with execution of the at least one transaction, and generating, in response to the executing the second script, a second timestamp indicative of the completing of the collection of data associated with execution of the at least one transaction; and collecting, based on the monitoring, data associated with execution of the at least one transaction, the collecting including collecting data associated with execution of the at least one transaction at a user endpoint, the user endpoint generating the request for data associated with the software application; and collecting data associated with execution of the at least one transaction at a provider endpoint, the provider endpoint generating and transmitting the response data to the user endpoint, the user endpoint being communicatively coupled to the provider endpoint;

determining one or more discrepancies between the data collected at the user endpoint and the data collected at the provider endpoint; and generating one or more corrections for correcting the one or more determined discrepancies and transmitting, based on the generated one or more corrections, a corrected response to the user endpoint.

14. The computer program product according to claim 13, wherein the operations further comprise:

receiving, in response to the injecting, a report indicating completion of the injection, wherein the monitoring further comprises transmitting a request to download the first script.

15. The computer program product according to claim 13, wherein the operations further comprise:

associating an identifier with the at least one of the data collected at the user endpoint and the data collected at the provider endpoint;

correlating, using the identifier, the data collected at the user endpoint and the data collected at the provider endpoint; and analyzing the correlated data.

16. The computer program product according to claim 13, wherein the monitoring includes at least one of the following: monitoring the at least one transaction being executed by the software application, monitoring a plurality of transactions being executed by the software application, and monitoring execution of the software application.

17. The computer program product according to claim 13, wherein the operations further comprise:

terminating collection of data upon completion of execution of the at least one transaction; and removing the injected agent.

* * * * *